United States Patent [19]
Kato

[11] Patent Number: 5,188,416
[45] Date of Patent: Feb. 23, 1993

[54] STRUCTURE FOR ATTACHING A CARPET TO A FORWARDLY FOLDABLE SEAT BACK

[75] Inventor: Takashi Kato, Akishima, Japan
[73] Assignee: Tachi S. Co. Ltd., Akishima, Japan
[21] Appl. No.: 871,398
[22] Filed: Apr. 21, 1992
[51] Int. Cl.⁵ .............................................. B60R 5/00
[52] U.S. Cl. ..................................... 296/65.1; 296/69
[58] Field of Search ................... 296/65.1, 69, 39.1, 296/37.16, 97.23

[56] References Cited

U.S. PATENT DOCUMENTS 4,709,964 12/1987 Seura.
4,848,826 7/1989 Kuwabara et al. ............. 296/65.1 X
5,011,210 4/1991 Inoue ..................................... 296/69

FOREIGN PATENT DOCUMENTS 202352 12/1982 Japan.

Primary Examiner—Charles A. Marmor
Assistant Examiner—Joseph D. Pape
Attorney, Agent, or Firm—Oldham, Oldham & Wilson Co.

[57] ABSTRACT

A structure for attaching a carpet to a forwardly foldable type of seat back in an automotive seat, wherein the portion of the carpet attached to the rear side of seat back is at its rear surface fixed with a separate hard member with a clearance from the back board of the seat back. This arrangement avoids slackened state of the carpet on the seat back.

9 Claims, 5 Drawing Sheets

STRUCTURE FOR ATTACHING A CARPET TO A FORWARDLY FOLDABLE SEAT BACK

BACKGROUND OF INVENTION

1. Field of the Invention

The present invention relates to a forwardly foldable type of seat back of a seat, which is rotable forwardly onto a seat cushion of the seat to provide a load-carrying platform upon the rear surface of seat back, and in particular to a structure for attaching a carpet to such rear surface of the forwardly-foldable-type seat back.

2. Description of Prior Art

Reference is made to FIG. 1 which shows, in perspective, a pair of ordinary forwardly-foldable-type seat back (SB') each being supported on a vertical wall area (6) in a vehicle or automobile. As shown by the arrows in FIG. 1 as well as in FIG. 2, both seat backs (SB)(SB') may be rotated forwardly towards a seat cushion (SC) and rested thereon, so that the rear surface of seat back (SB), for instance, may serve as a part of load-carrying platform, extending horizontally flush with a main load-carrying platform (L). FIG. 2 shows the seat back (SB) to be rested upon the seat cushion (SC), presenting its rear surface as a part of load-carrying platform, thereby enlarging the platform area from the main one (L).

On the main platform (L), a carpet (C) is fixed to give an aesthetically improved appearance and smooth touch thereon, as in ordinary manner.

As best seen in FIG. 2, similarly to the main platform (L), there is fixed a carpet (2) on the rear surface of seat back (SB). More concretely in this respect, the seat back (SB) has, attached to its rear side, a flat plate-like frame (3), and further laminated upon that frame (3) are a back board (1) and the foregoing carpet (2). At both lower corner portions of the seat back (SB), a pair of hinge members (4, 5, 51) are respectively provided, which are in turn fixed to the vertical cabin wall area (6) extending vertically from the main load-carrying platform (L). Each of the hinge members is composed of a stationary support bracket (5), a shaft (51), and a rotatable securing bracket (4). For instance, with regard to the right-side hinge member as viewed from FIG. 2, by referring also to FIGS. 3 and 4, the stationary support bracket (5) is fixed to the vertical cabin wall area (6), extending therefrom perpendicularly to support the L-shaped rotatable bracket (4) via the shaft (51). The free end of the rotatable bracket (4) is fixed to the recessed corner portion (31) of a back frame (3) provided at the rear side of seat back (SB), by means of a bolt (41), as best shown in FIG. 4. With this hinge arrangement, the seat back (SB) is free to rotate about the shafts (51) vertically or in a fore-and-aft direction relative to the seat cushion (SC) which is fixed on the side of floor (F). In this art state, to cover the bolt (41) and free end portion of rotatable bracket (4), a cover member (4a) made of synthetic resin material is fit over those elements as in FIGS. 3 and 4, and therefore, the corresponding corner portions of both back board (1) and carpet (2) are cut along the region where the cover member (4a) lies.

FIGS. 5 and 6 shows another mode in reference to the lower corner of seat back (SB) which is connected to the same rotatable securing bracket (4). According thereto, while the corresponding corner portion of back board (SB) is cut as above, the carpet (2) is not so cut, extending its both corners in a manner conforming to those of seat back (SB) as can be seen from FIGS. 5 and 6. As a result, as noticed best from FIG. 6, the corner portion (22) of carpet (2) lies on the bolt (41) and over both bracket (4) and recessed area (31) of back frame (3), thereby serving to cover them.

However, a problem exists for both foregoing two modes of prior art, in that, as to the first mode shown in FIGS. 2 to 4, labor and costs are required to prepare and fit the cover member (4a) to the seat back (SB), leaving further an objectionable spot at the cover member in the back side of seat back (SB) from an aesthetic viewpoint, and as to the second mode shown in FIGS. 5 and 6, the corresponding carpet corners (22) are left loose or slacked, posing also an objectionable spot in the appearance at the back side of seat back (SB) and possibility of those carpet corners (22) being easily turned over.

SUMMARY OF THE INVENTION

With the above-stated shortcomings in view, it is therefore a purpose of the present invention to provide an improved structure for attaching a carpet to a forwardly foldable type of seat back, which eliminates the possibility of the carpet being partly loose or slacked at the back side of seat back to prevent the same from being turned over therefrom.

In order to achieve such purpose, according to the invention, there is basically provided the structure in which the seat back is rotatably connected, via a pivot means, to either a part of cabin of automobile or an area of seat cushion side, with the carpet being adhesively attached to a back board of the seat back, and the pivot means is covered with a part of the carpet, the structure being characterized in that a plate means of a hard material is fixed to a reverse side of such carpet part covering the pivot means, and the plate means is provided separately from the back board.

Accordingly, the loose portion of carpet is stretched evenly by virtue of the plate means so as to provide a uniformly expanded appearance over the entirety of carpet or the rear side of seat back.

In one aspect of the invention, the back board is cut at a portion corresponding to that loose or slacked portion of carpet, and the plate means comprises a plate having a shape generally same with that of thus-cut portion of back board, with such an arrangement that the plate is fixed to the rear side of such loose portion of carpet, allowing the plate to be moved relative to the pivot means. In that way, the inner part of seat back can be made accessible by turning that carpet portion upwardly, for expediting the seat assembling steps.

Preferably, a clearance may be provided between the back board and plate, so that the plate itself is readily rotatable via a corresponding layer of the carpet in relation to the clearance, to thereby be movable vertically with respect to the pivot means.

Preferably, the foregoing cut portion of back board may be a corner area of the same, and the plate may be formed generally in a triangular shape, such that thus-formed triangular plate is adhesively attached to the reverse side of corresponding part of carpet, with a clearance being provided between the back board and plate.

DETAILED DESCRIPTION OF PREFERRED EMBODIMENTS OF THE INVENTION

First of all, it should be understood that the present invention is directed to an improvement upon the previously stated prior arts, utilizing most of associated elements therein, and thus all like designations in the prior art description correspond to all like designations to be given in the present description hereinafter. Therefore, a specific explanation is deleted for the common elements for the sake of simplicity in description.

Figure 1:
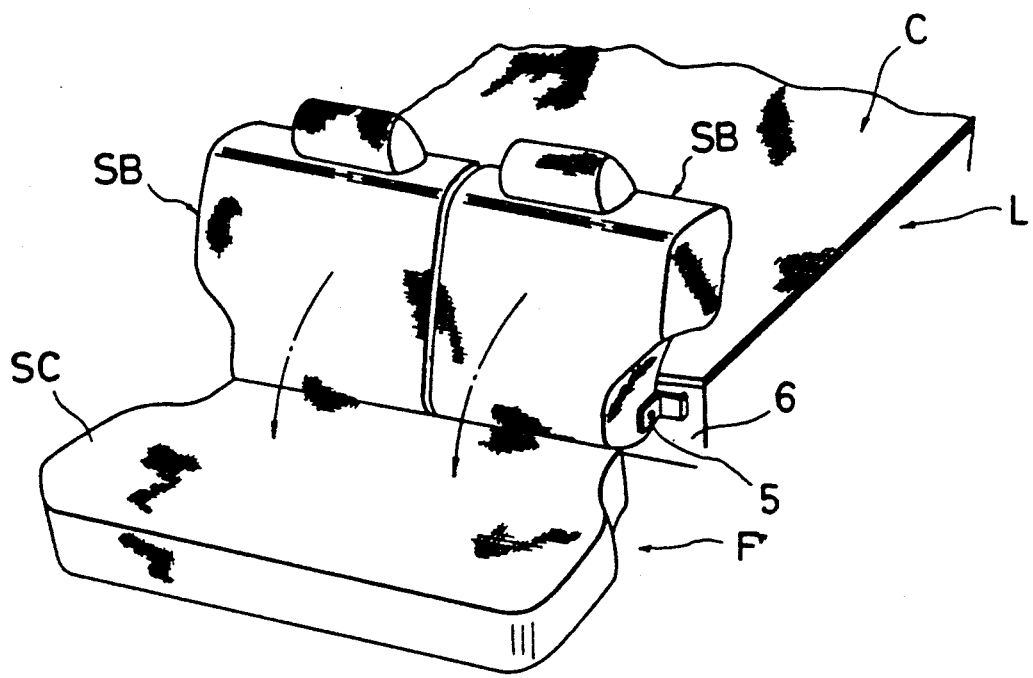
FIG. 1 is a partly broken perspective view of conventional seat with a forwardly foldable type of seat back.
Figure 2:
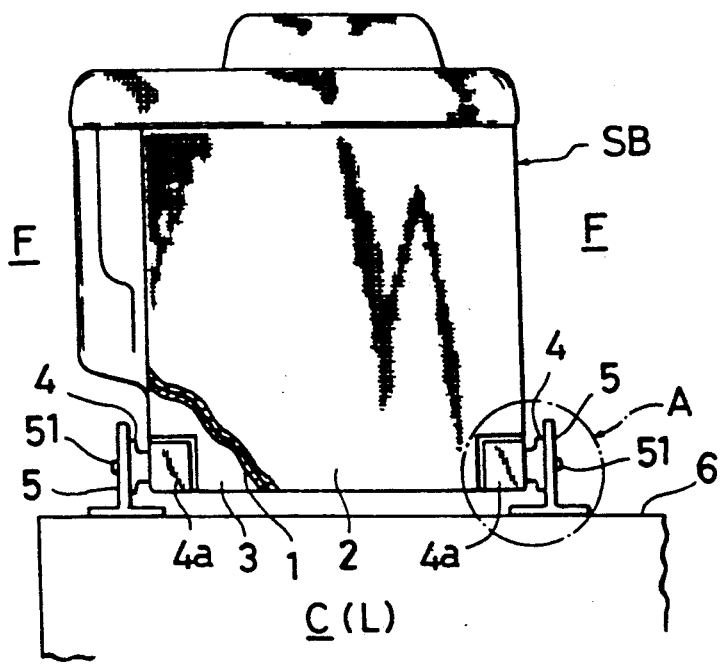
FIG. 2 is a partly broken plan view showing the seat back to be folded down to the seat cushion as in FIG. 1.
Figure 3:
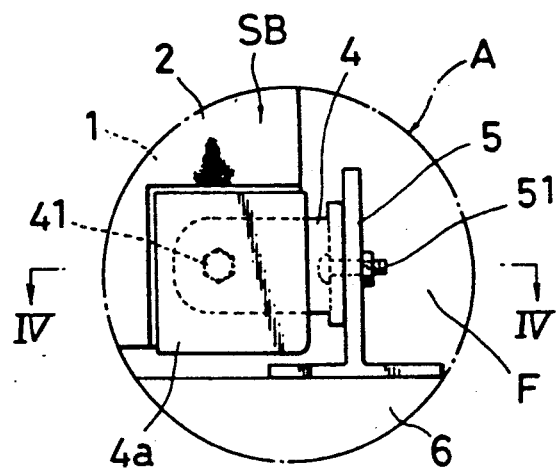
FIG. 3 is a partly englaged view taken from the portion A in FIG. 2.
Figure 4:
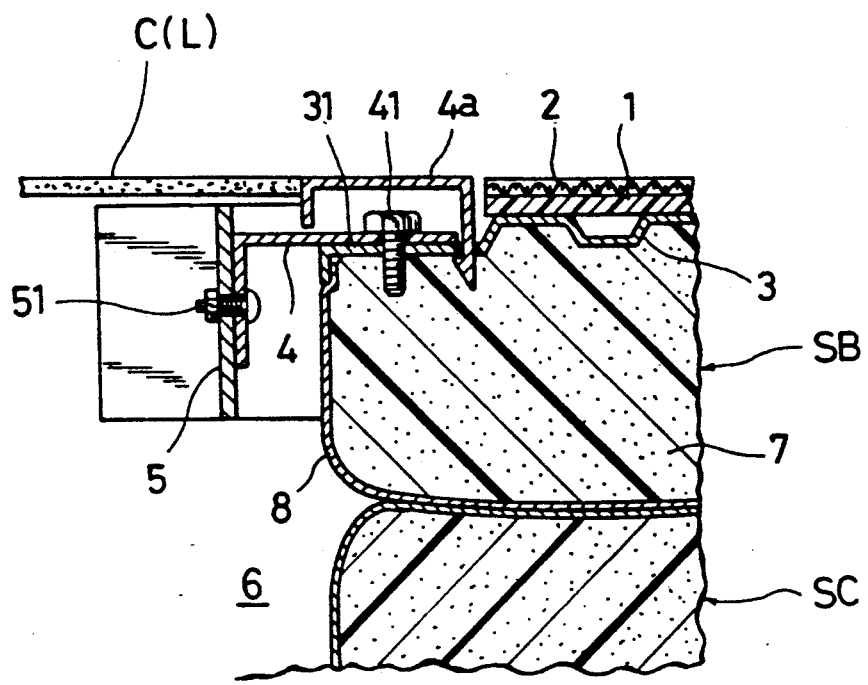
FIG. 4 is a sectional view taken along the line IV—IV in FIG. 3.
Figure 5:
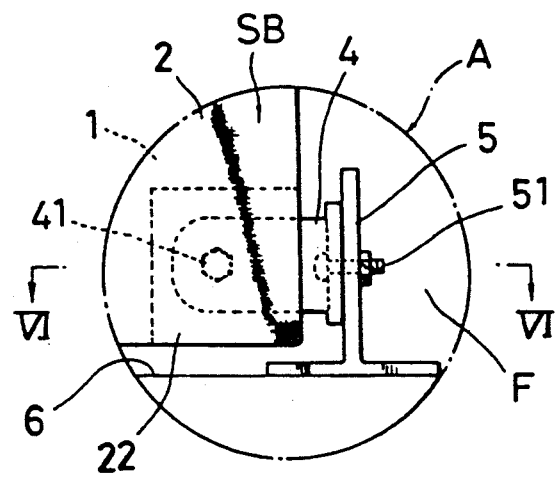
FIG. 5 is a partly enlarged view directed to another mode of prior art at the portion A.
Figure 6:
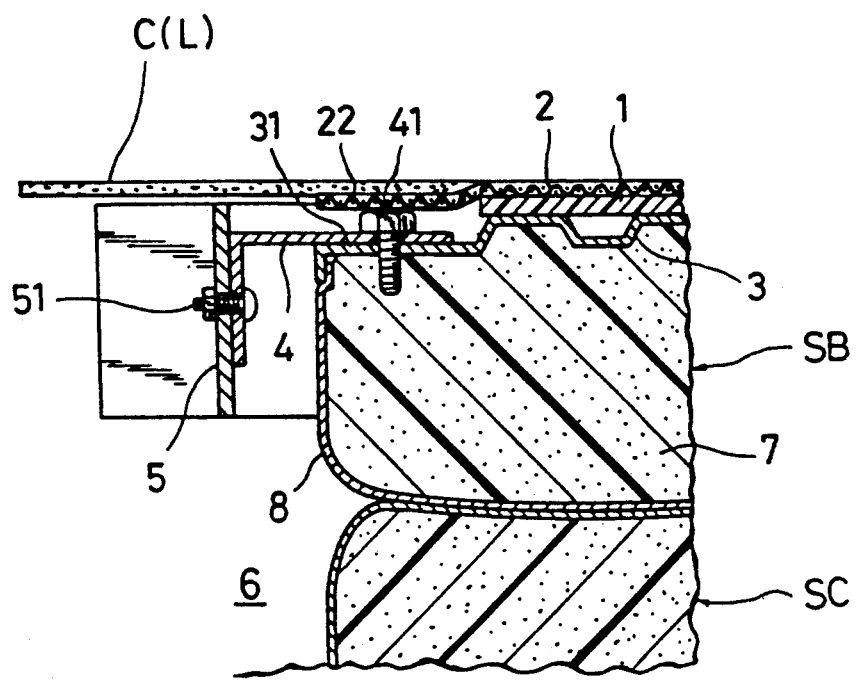
FIG. 6 is a sectional view taken along the line VI—VI in FIG. 5.
Figure 7:
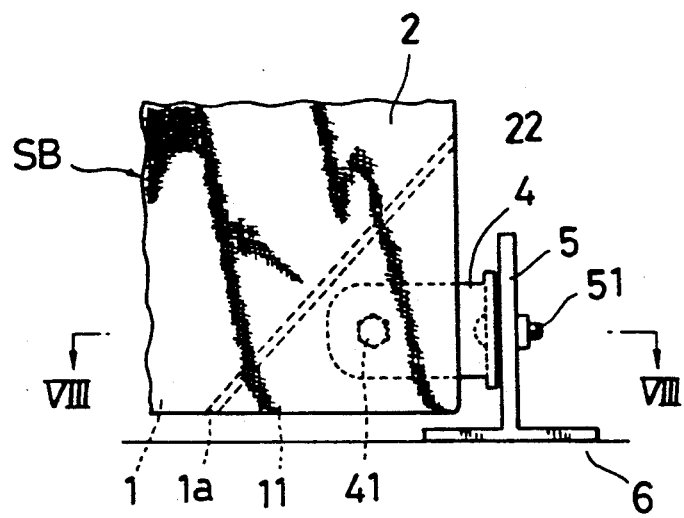
FIG. 7 is a partly broken plan view of seat back showing a structure for attaching a carpet thereto in accordance with the present invention.
Figure 8:
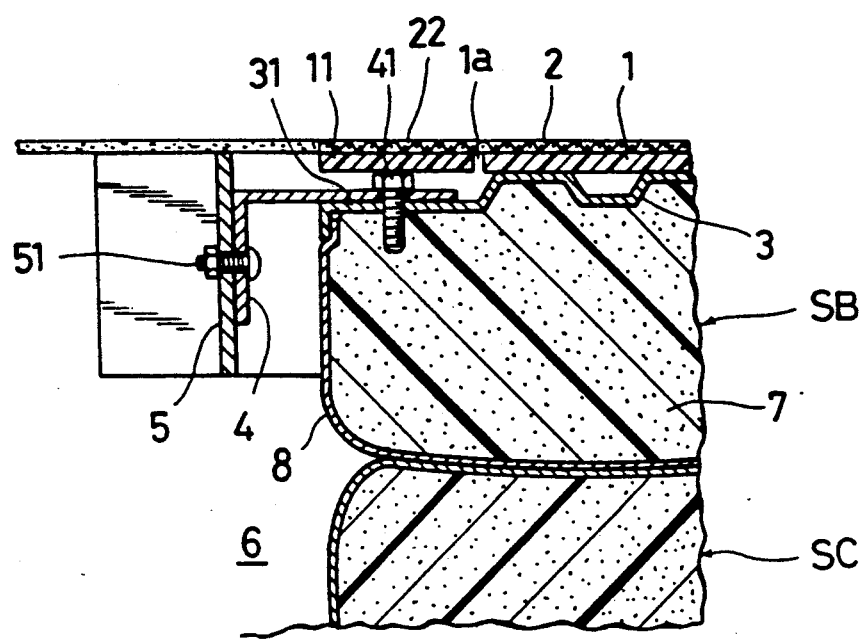
FIG. 8 is a sectional view taken along the line VIII—VIII in FIG. 7.

FIG. 7 illustrates the state where the hinged seat back (SB) is rested upon the seat cushion (SC), in conjunction with FIG. 8. The carpet (2) is shown as being uniformly expanded over the back side of seat back (SB), as likewise in the second prior art mode in FIG. 5.

In accordance with the present invention, the corner portion of back board (1) is cut in a slant way as shown by the phantom line in FIG. 7, such as to leave an imaginary triangularly-cut region over the free end portion of rotatable securing bracket (4). Thus, only the corner portion (22) of carpet (2) extends over such imaginary triangular region to overlie the bolt (41) as well as free end portion of rotatable securing bracket (4).

Bonded to the reverse side of thus-loose carpet corner portion (22), is a triangular hard plate (11) such that its oblique side is located a slight distance from the opposed oblique cut side of the foregoing back board corner portion, thereby providing a clearance (1a) therebetween. The hard plate (11) is made of a same material with that of the back board (1), such as a cardboard or a hard synthetic resin, or other proper similar material, and further generally corresponds in thickness to the back board (1).

Figure 9:
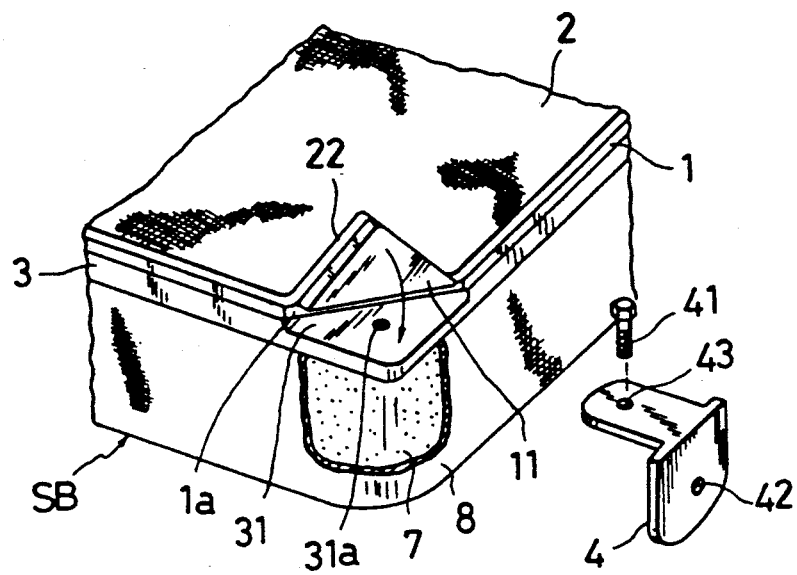
FIG. 9 is a partly broken, exploded perspective view of the carpet attaching structure.

Accordingly, it is to be appreciated that the triangular region thus defined in the carpet corner portion (22), the reverse side of which is bonded with the hard plate (11), can readily be turned vertically relative to the longitudinal axis of clearance (1a) due to only the soft layer of carpet (2) laying over that clearance (1a) (see FIG. 9).

Figure 10:
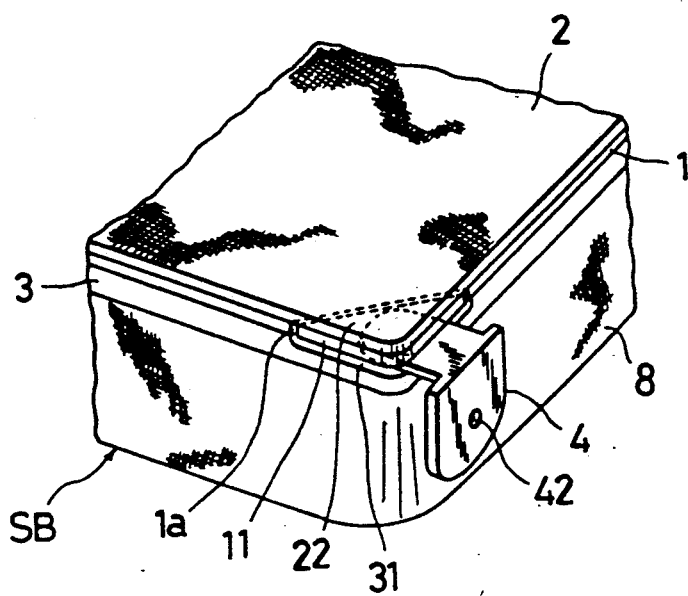
FIG. 10 is a partly broken perspective view of the same structure as in FIG. 9, showing a completed state thereof.

With the above arrangement, reference being now made to FIGS. 9 and 10, an explanation will be made as to the way in which the rotatable bracket (4) is secured into between thus-formed carpet corner portion (22) and recessed area (31) of frame (3). In assemblage, at the outset, as shown in FIG. 9, the triangular carpet corner (22) is turned upwardly relative to the clearance (1a) to open the recessed area (31), rendering accessible the same as well as the threaded hole (31a) from the outside.

Then, the free end portion of rotatable bracket (4) is fixedly mounted on the recessed area (31) by means of the bolt (41) being threadely connected into the hole (31a). Thereafter, as indicated by the arrow in FIG. 9, the carpet corner (22) in question is turned downwardly towards thus-mounted free end portion of bracket (4), so that, as shown in FIG. 10, the carpet corner portion (22) lies over such mounted portion in registry with remainder portion of carpet (2), thereby providing a uniformly expanded appearance over the entirety of carpet (2) or the rear side of seat back (SB).

Preferably, the hard plate (11) may be bonded to both free end portion of bracket (4) and surface of recessed area (31) of frame (3), in order to prevent the corresponding carpet corner portion (22) from being idle or loose.

What is claimed is:

1. A structure for attaching a carpet to a seat back of a type rotatable forwardly relative to a seat cushion, in a seat, in which said seat back is rotatably connected, via a pivot means, to a part of the cabin of the automobile and an area of the seat cushion side, with said carpet being adhesively attached to a back board of said seat back, and said pivot means is covered with a part of said carpet, characterized in that a plate means of a hard material is fixed to a reverse side of said carpet part covering said pivot means, and said plate means is provided separately from said back board.

2. The structure as defined in claim 1, wherein said plate means is made of a material of the same thickness as that of said back board of said seat back.

3. The structure as defined in claim 1, wherein said back board is cut at a portion corresponding to said part of said carpet, wherein, to said reverse side of said carpet part, said plate means is fixed, such that a means is provided at said carpet part, which allows said plate means to be moved relative to said pivot means, and wherein said plate means is made of a material of the same thickness as that of said back board of said seat back.

4. The structure as defined in claim 3, wherein said means is a clearance between said back board and plate means, so that said plate means is readily rotatable via a corresponding layer of said carpet in relation to said clearance, to thereby be movable vertically with respect to said pivot means.

5. The structure as defined in claim 3, wherein said means is a clearance between said back board and plate means, and wherein said plate means includes a side defined adjacent to said clearance, said side being so formed as to facilitate said movement of said plate means, whereby said plate means is readily rotatable via a corresponding layer of said carpet in relation to both said side and clearance, to thereby be movable vertically with respect to said pivot means.

6. The structure as defined in claim 5, wherein said side of said plate means is formed obliquely in said clearance.

7. The structure as defined in claim 3, wherein said back board is cut obliquely at one side thereof, whereas also said plate means is at one side thereof cut obliquely in a parallel and spaced-apart relation with said obliquely cut side of said back board, and wherein said means forms a clearance extending between said back board and plate means, so that said plate means is readily rotatable about a longitudinal axis of said clearance via a corresponding layer of said carpet, to thereby be movable vertically with respect to said pivot means.

8. The structure as defined in claim 1, wherein said pivot means comprises a rotatable bracket and a stationary support bracket, said rotatable bracket being fixed to a back frame of said seat back and pivotally connected to said stationary support bracket which is fixed to said cabin part and said cushion side area, wherein said rotatable bracket is disposed at a lower corner portion of said seat back, wherein said carpet part is a lower corner portion of said carpet covering said lower corner portion of said seat back as well as thus-disposed rotatable bracket, and wherein said plate means comprises a triangular plate having a pair of first sides matching to said lower corner portion of said carpet.

9. The structure as defined in claim 8, wherein said triangular plate is made of a material of the a same thickness as that of said back board of said seat back, said triangular plate further having a second side which extends obliquely between said pair of first sides, and wherein said back board is cut obliquely at a portion thereof corresponding to said corner portion of seat back, such that a clearance is defined between those two oblique sides of said triangular plate and back board.

* * * * *